Patented Nov. 6, 1928.

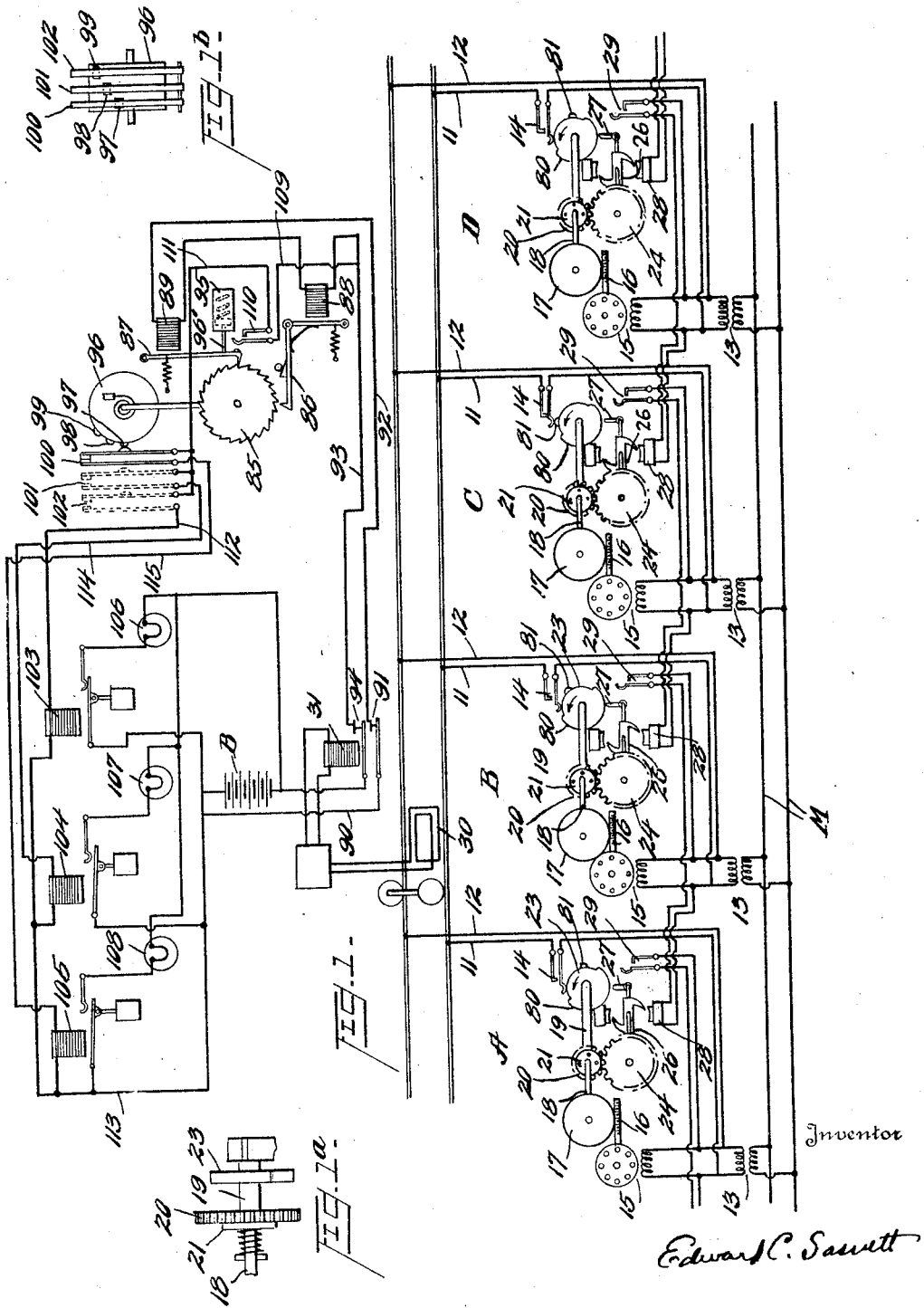

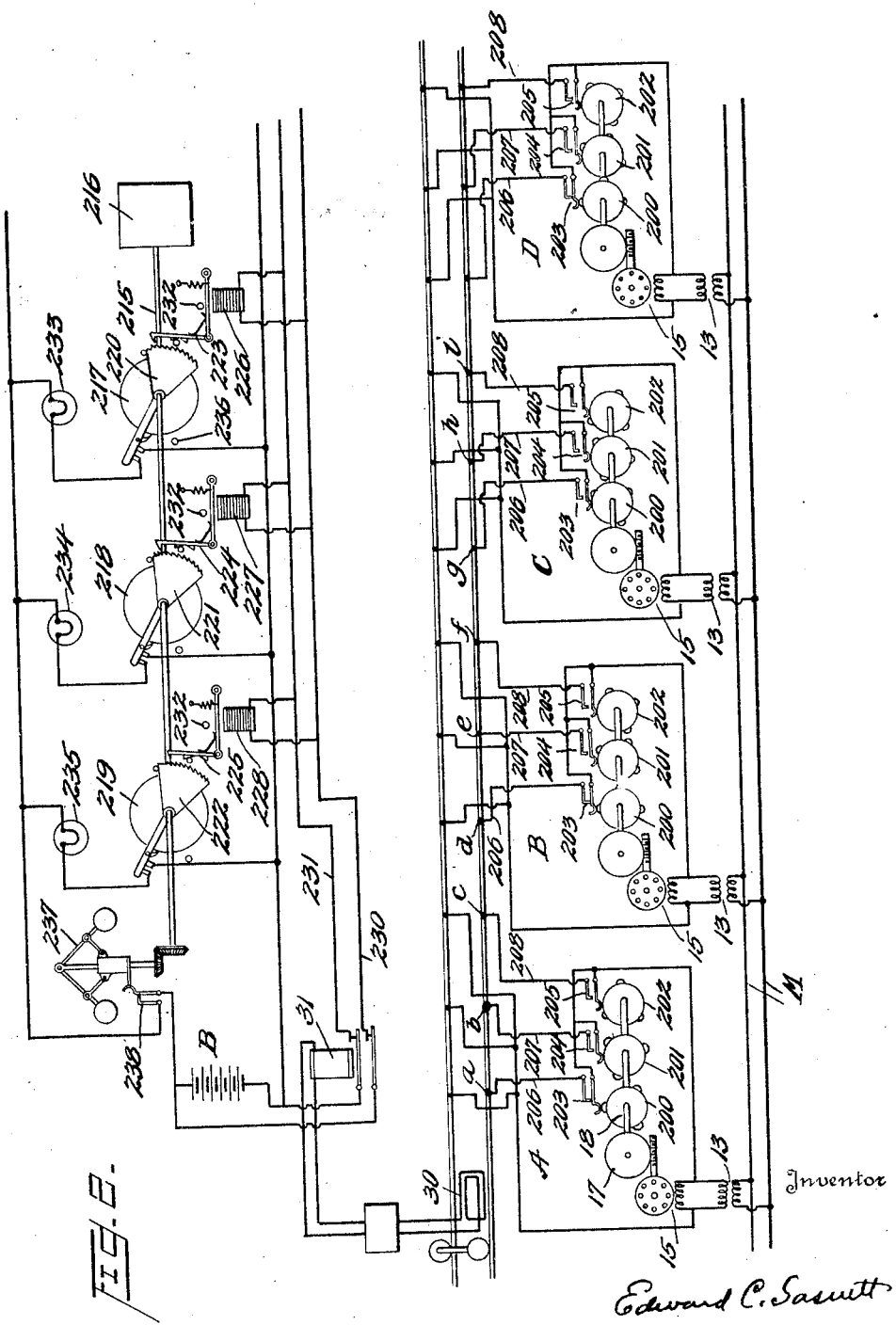

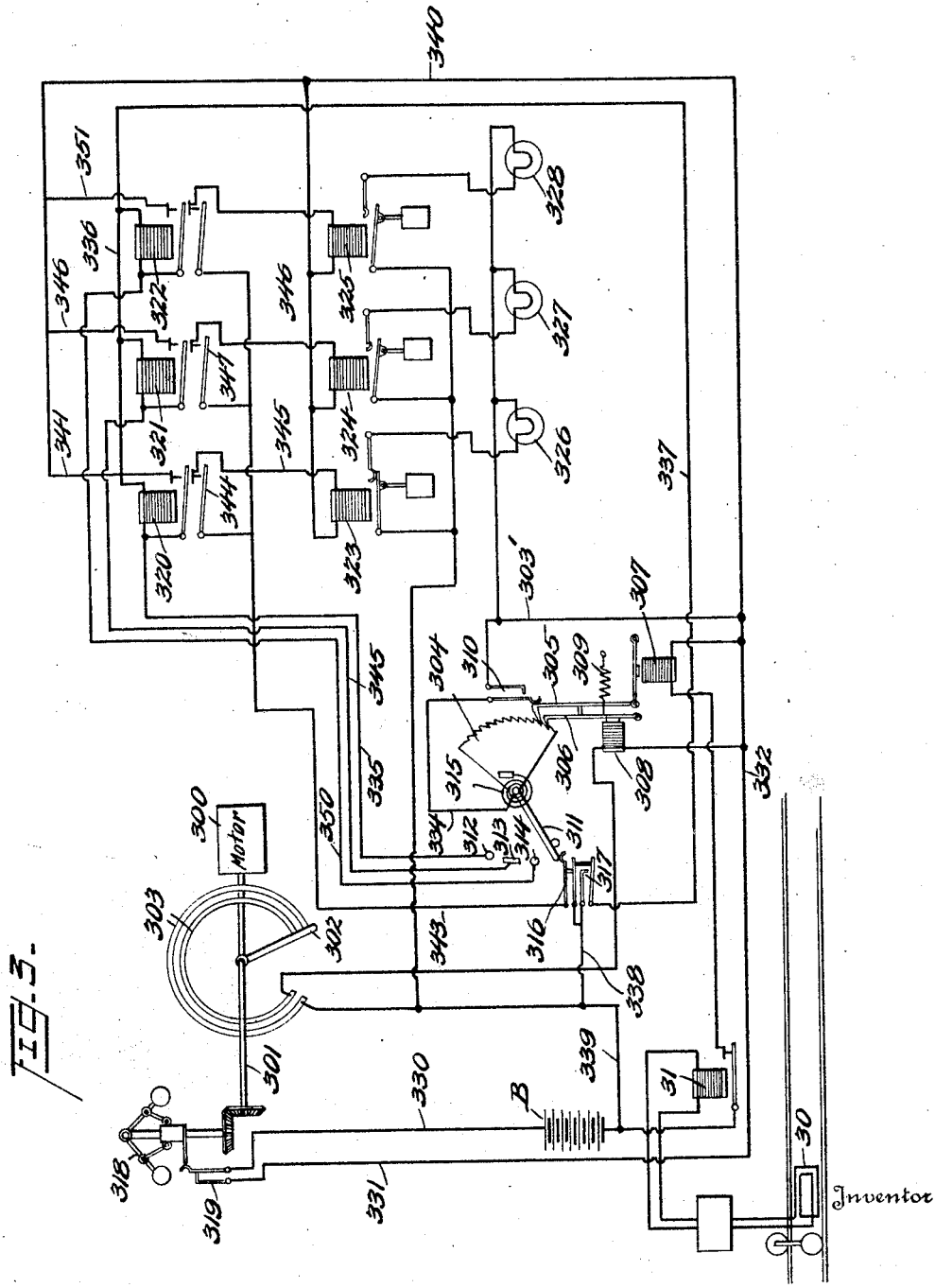

1,690,505

UNITED STATES PATENT OFFICE.

EDWARD C. SASNETT, OF WASHINGTON, DISTRICT OF COLUMBIA.

AUTOMATIC TRAIN-CONTROL SYSTEM.

Application filed August 7, 1925. Serial No. 48,746.

The present invention relates to automatic train control systems of the continuous indication type.

The invention has for its object to provide a system in which the various indications are controlled by codes of electrical impulses transmitted from the track in any suitable manner, the indications varying in accordance with the particular code transmitted.

The acompanying drawings illustrate several substantially different embodiments of the invention.

Fig. 1 is a diagrammatic view of a system employing synchronized track circuit controllers; Figs. 2 and 3 are diagrammatic views of systems employing non-synchronized controllers; and Figs. 1$^a$ and 1$^b$ are detail views of certain elements of the system shown in Fig. 1.

Referring first to the system shown by Fig. 1, conducted across the rails of a conductively continuous stretch of track 10 at regularly spaced stations A, B, C and D are conductors 11 and 12 leading respectively to the terminals of transformers 13, the primaries of these transformers being connected across alternating current power mains M. A switch 14 is inserted in the conductor 11 and is adapted to be periodically operated by mechanism hereinafter described so as to impress the voltages of the secondaries across the track rails at certain intervals.

There is provided at each station a single phase motor 15 fed from the secondary of the respective transformer. Rigid with the armature of each of these motors is a worm shaft 16 meshing with a worm wheel 17 secured on a shaft 18. Rotatable on shaft 18 is a sleeve 19 rigid with which is a gear 20 frictionally engaged by a disk 21 splined on shaft 18, a spring effecting a suitable pressure between the disks, see Fig. 1$^a$. Secured to sleeve 19 is a cam 23 having raised portions adapted to operate circuit controllers 14.

Meshing with gear 20 is a gear 24 rigid with a shaft, and also rigid with said shaft is a Z-shaped armature 26 and an arm 27. Armature 26 has curved pole faces coacting with concave pole faces of magnets 28. Arm 27 is adapted to close circuit controller 29 for an instant at a certain point in each revolution of shaft 25. The diameter of gear 24 is exactly twice that of gear 20, so that cam 80 will always occupy a certain position when the armature 26 lies in the magnetic axis of magnets 28.

It will be observed that when arm 27 closes switch 29 at any given station, the circuit of magnet 28 at the station immediately in rear is closed. If the raised portions of cams 23 at the two stations are in correct relative positions, armature 26 at the rear station will lie in the magnetic axis of magnets 28 when switch 29 at the advance station is closed. If the raised portions are not in correct relative positions, armature 26 at the rear station will be drawn into the magnetic axis, rotating the cam at the rear station, this adjustment being permitted by the frictional connection of the cam with the driving shaft 18.

Each cam 23 comprises a long raised portion 80 extending through an arc of about 180° and having the same angular position at all of the stations, and a short raised portion 81, which at any given instant occupies a different angular position at stations in the same group. The stations are arranged in groups of three. Stations A, B and C constitute one group, and station D is the first of the group of three next in advance. At stations A and D the projections 81 have the same angular position, and this is true of these projections at stations B and E (not shown) and at stations C and F (not shown). That is to say, the projections 81 have different angular positions at stations of the same group but have the same angular positions at corresponding stations of the several groups. With this disposition it will be obvious that a vehicle under clear conditions (three blocks ahead clear) will receive three short current impulses followed by a long impulse, at regularly recurring intervals. With only two blocks ahead clear (caution conditions) the vehicle will receive two current impulses followed by a long impulse, and under danger conditions (one block ahead clear) it will receive one short current impulse followed by a long impulse.

The vehicle equipment includes a coil 30 disposed in inductive relation to the track rails, an electro-magnetic relay 31 and an amplifier between the coil and relay. Relay 31 controls the operation of impulse mechanism including a ratchet wheel 85, a driving pawl 86 and a holding pawl 87. The driving pawl is operated by a magnet 88 and the holding pawl by a magnet 89. These magnets are connected in series so as to be energized when relay 31 is energized by means of the following circuit: battery B, conductor 90, front contact 91, conductor 92, magnets 89 and 88, conductor 93 and back to battery through front contact 94. Pawl 86 is adapted to be operated by magnet 88 to step wheel 85 through an angle of one tooth upon the reception of each short impulse and of course to step it through the same angle at the beginning of the long impulse, but pawl 87 is not operated to release wheel 85 until energized a predetermined time upon reception of the long impulse. Any suitable means for retarding the action of pawl 87 may be used. The means illustrated consists of a dash pot 95 having a stem 96' on its plunger abutting the back side of pawl 87, the parts being constructed to retard the release movement sufficiently to prevent release of wheel 85 when short impulses are being received.

Rigid with wheel 85 is a disk 96 having on its periphery three projections 97, 98 and 99 (Fig. 2ª). These projections are circumferentially and axially displaced with respect to each other, and are adapted respectively to operate circuit controllers 100, 101 and 102. When the wheel is stepped through two teeth, projection 97 closes controller 100; when stepped through three teeth, projection 98 closes controller 101; and when stepped through four teeth, projection 99 closes controller 102. These circuit controllers control magnets 103, 104 and 105, respectively, and these magnets in turn control a green lamp 106, a yellow lamp 107 and a red lamp 108.

As above pointed out, under clear conditions the vehicle receives at regularly recurring intervals three short impulses followed by a long impulse. The three short impulses operate to step wheel 85 through an angle of three teeth and then at the beginning of the long impulse the wheel is stepped through an additional tooth and shortly thereafter the holding pawl is withdrawn from wheel 85 and the latter resumes initial position being biased to such position by a spring, as indicated on the drawing, and being stopped at such position by a suitable stop, not shown. An instant before wheel 85 is released the following circuit is closed: battery B, front contact 94, conductor 93, conductor 109, contacts 110 (closed by pawl 87 in advance of the release of wheel 85) conductor 111, contacts 102, conductor 112, magnet 103, and back to battery through conductor 113. Thus under clear conditions, magnet 103 is intermittently energized, operating to maintain the circuit of green lamp 106 closed. The interval separating the impulses through magnet 103 will depend of course upon the angular velocity of cams 23, and this may be of any value desired. If for example these cams make one revolution every four seconds, magnet 103 will receive an impulse every four seconds, under clear conditions.

Under caution conditions, the vehicle will receive two short impulses followed by a long impulse. Accordingly in each cycle of operations wheel 85 will be stepped through three steps and then released. When the wheel is stepped through three steps the contacts of controller 101 are closed and therefore just prior to the release of the wheel the following circuit is closed: battery B, front contact 94, conductors 93 and 109, contacts 110, conductor 111, circuit controller 101, conductor 114, magnet 104 and back to battery through conductor 113. Hence under caution conditions magnet 104 will be intermittently energized, operating to maintain closed the circuit of caution lamp 107. Magnet 103 being no longer energized, its dash pot controlled armature will fall and open the circuit of the clear lamp.

Under danger conditions, the vehicle will receive at recurring intervals one short impulse followed by a long impulse. These impulses will operate wheel 85 through two teeth and then release the wheel. When the wheel is operated through two teeth, projection 97 closes the circuit controller 100, and just before the wheel is released the following circuit is closed: battery B, front contact 94, conductors 93 and 109, contacts 110, conductor 111, controller 100, conductor 115, magnet 105, and back to battery through conductor 113. Hence under danger conditions magnet 105 will be intermittently energized to hold closed the circuit of danger lamp 108.

It will be observed that this system gives substantially continuous indications of the condition of three blocks ahead, operating selectively in accordance with particular codes of impulses.

The system illustrated by Fig. 2 operates in accordance with the number of short impulses received in a fixed interval of time. The track is conductively continuous, as in the system illustrated in Fig. 1. In the present system there is a motor station A, B, C, D, etc., located at every third block. At each of these stations there is a single phase motor 15 operating a wheel 17 and shaft 18, as before. Fixed on shaft 18 are three disks 200, 201 and 202, each having short projections, or teeth, adapted to operate circuit controllers 203, 204 and 205, said circuit controllers being connected respectively to conductors 206, 207 and 208 leading to one rail of the track at regularly spaced points $a$, $b$, $c$, $d$, etc., the stretch of track between adjacent connections being considered a block. One side of transformer 13 is connected to one of the contacts of the circuit controllers, while the other side is connected to the other track rail respectively opposite the points of connection of conductors 206, 207 and 208.

At station A the teeth on each of disks 200, 201 and 202 are spaced 120°, but any one tooth has a different angular position from each of the other teeth. The teeth at station C are also displaced 120° on the three disks, with the teeth on any one disk displaced with respect to those on the other two. At stations B and D the teeth on each of disks 200, 201 and 202 are separated by angle of 90°, and all of the teeth at these respective stations are displaced with respect to each other. It will be understood therefore that the teeth at any one station are adapted to close the circuit controllers 203, 204 and 205 successively, no two teeth at any one station closing the circuit controllers simultaneously.

Assuming that shaft 18 makes one revolution every four seconds, it will be clear that the vehicle shown will receive so far as station A is concerned, nine short impulses every four seconds, due to the successive operation of controllers 203, 204 and 205 at this station. It will also receive impulses from the operation of the controllers at station B, but the operation of the controllers at station C will be ineffective, due to the impedance offered by the rails to the flow of alternating current, the frequency of the current being high enough to bring about this result.

Clear conditions obtain when there are at least three blocks in advance clear. Suppose there is a vehicle in the block between the points $a$ and $b$ and another vehicle in the block between the points $d$ and $e$. Current impulses will be received by the rear vehicle from the operation of controllers 204 and 205 at station A and also from the operation of controller 203 at station B. Due to the fact that the controllers at stations A and B are not synchronized, as in the system of Fig. 1, it is possible that one of the controllers 204 or 205 will be operated by a tooth at the same instant controller 203 is being operated at station B. If this should be the case, it is clear that the rear vehicle would receive only eight short impulses during the four-second period. It is obvious therefore that a vehicle travelling under clear conditions will receive at least eight short impulses every four seconds.

Considering caution conditions, suppose a vehicle is in the position shown on the drawing and an advance vehicle is in the block between the points $b$ and $c$. In this case, the rear vehicle would receive current impulses from the operation of controllers 203 and 204 at station A, obviously, six impulses every four seconds. But suppose the rear vehicle is in the block between $b$ and $c$ and the advance vehicle is in the block between $d$ and $e$. In this case the rear vehicle would receive impulses from the operation of controller 205 at station A and controller 203 at station B. If a tooth on disk 202 at station A is not in synchronism with a tooth on disk 200 at station B, the rear vehicle would receive six impulses every four seconds, as before; but if there are two teeth at the stations operating the controllers 205 and 203 synchronously, the rear vehicle would receive only five impulses every four seconds. Under caution conditions therefore a vehicle will receive either five or six impulses every four seconds.

Under danger conditions of course a vehicle will receive three impulses every four seconds.

To sum up; under clear conditions a vehicle will receive at least eight impulses every four seconds; under caution conditions, five or six impulses every four seconds; under danger conditions, three impulses every four seconds.

Various mechanisms can be designed which will operate to give a clear indication on the vehicle when at least eight impulses are received every four seconds; a caution indication when five to six impulses are received; and a danger indication when three impulses are received. It may be pointed out here that the number of teeth on the disks, the angular velocity of shaft 18 and the angles between the teeth may be varied as desired, the figures given being merely by way of example.

As illustrated in the drawing, the selective mechanism responsive to the number of impulses received in a given time, comprises a shaft 215 driven at a constant angular velocity by a motor 216 of any suitable character; and the following mechanism controlled by the operation of said shaft. Fixed on the shaft are three wheels 217, 218 and 219, and rotatable on the shaft adjacent the respective wheels are toothed segments 220, 221 and 222, adapted to be driven by pawls 223, 224 and 225, said pawls being operated respectively by magnets 226, 227 and 228. Each of the segments has an arm rigid therewith carrying a pawl, or shoe, engaging the peripheries of wheels 217 etc., so that when the segments are operated by the pawls the arms are rotated upwardly, and in the intervals when the pawls are not operated the arms move down with the wheels due to the engagement therewith of the shoes.

Magnets 226, 227 and 228 are connected in parallel across conductors 230 and 231 which connect to front contacts of relay 31, whereby the magnets are simultaneously energized upon the reception of each impulse. The pawls have different throws whereby they operate the segments through different angles on each operation. Pawl 223 has the smallest throw; pawl 224 has a somewhat larger throw; and pawl 225 has a still larger throw. The speed of the motor and throw of pawl 223 is such that if eight or more impulses are received every four seconds, segment 220 will be maintained in such position that its arm will close the circuit through clear lamp 233, but if the number of impulses fall below this the arm of the segment will rotate with wheel 217 until stopped by pin 236, opening the circuit of the clear lamp. The throw of pawl 224 is such that the circuit of caution lamp 234 will be closed so long as the frequency of the impulses does not fall below five per four seconds; and the throw of pawl 225 is such that the circuit of danger lamp 235 is opened if the frequency of the impulses falls below three per four seconds.

In this system a false clear indication may be received if the speed of the motor 216 should fall below its predetermined rate. I provide, therefore, a centrifugal device 237 driven by shaft 215 adapted to open a circuit controller 238 in the common return of the signal circuits whenever the speed of the motor drops below its predetermined speed of operation.

Fig. 3 illustrates a modified form of apparatus adapted for use with a track system such as shown by Fig. 2. This system includes a constant speed motor 300 driving a shaft 301 on which is fixed an arm 302 sweeping over contact segments 303 during a greater part of its revolution; and an impulse mechanism including a toothed segment 304 operated by a pawl 305 and held in operated positions by a dog 306. Pawl 305 is operated by a magnet 307 and dog 306 is operated by a magnet 308. Dog 306 is held in engagement with the teeth of segment 304 when magnet 308 is energized, and is released by a spring 309 when the magnet is deenergized. When dog 306 is released it also disengages driving pawl 305, and the latter in its disengaging movement closes a circuit controller 310. Segment 304 has an arm 311 adapted to engage contacts 312, 313 and 314. Segment 304 is biased, as by a spring 315, to the position shown, closing in this position contacts 316 and opening contacts 317. A governor, or centrifugal device, 318 operating a circuit controller 319 assures that motor 300 will operate at a predetermined speed. Contacts 312, 313 and 314 are in the circuits respectively of stick relays 320, 321 and 322, these relays controlling magnets 323, 324 and 325, the latter, in turn, controlling clear, caution and danger lamps 326, 327 and 328, respectively.

With the assumptions made with respect to the system of Fig. 2, it may be assumed that the time during which the contact segments 303 are bridged is four seconds per revolution of arm 302. When these segments are bridged the circuit of magnet 308 is closed, as will be obvious from the drawing, and the driving pawl 305 and holding pawl 306 are engaged with the teeth of segment 304. Thus the mechanism is conditioned for operating segment 304 for a period of four seconds at recurring intervals.

It will be recalled that at least eight impulses are received under clear conditions every four seconds; five to six under caution conditions; and three under danger conditions. If, therefore, the vehicle is travelling under clear conditions, magnet 307 will receive at least eight impulses from battery B during the four second interval in which segments 303 are bridged, the circuit of magnet 307 being closed when relay 31 is energized, as will be obvious from the drawing. These eight or more impulses will operate to step segment 304 through eight steps, the segment having only eight teeth so that it cannot be stepped further. When the segment is stepped through eight steps, arm 311 engages contact 312, so that when arm 302 passes out of engagement with contact segments 303, dog 306 and pawl 305 are released from the segment closing the following circuit: battery B, conductor 330, controller 319, conductors 331, 332 and 303′, contacts 310, conductor 334, arm 311, contact 312, conductor 335, stick relay 320, conductors 336 and 337, contacts 317, and back to battery through conductors 338 and 339. Relay 320 is energized only for an instant but sufficiently to cause it to pick up. Relay 320 is held energized, however, until arm 311 reaches its initial position, by means of the following stick circuit: battery B, conductor 330, controller 319, conductors 331, 332, 340 and 341, front contact of relay 320, the relay winding, conductors 336 and 337, contacts 317 and back to battery through conductors 338 and 339. As said arm 311 approaches its initial position and just before it opens the stick circuit, closes at contacts 316 the following circuit: battery B, conductors 339 and 338, contacts 316, conductor 343, front contact 344 of relay 320, conductor 345, magnet 323, conductors 346, 340, 332 and 331, controller 319 and conductor 330.

If the vehicle is travelling under caution conditions, segment 304 will be operated through an angle of either five or six teeth during the four second interval in which the contact segments 303 are bridged. In either case arm 311 will engage contact 313, this contact being long enough for that purpose. Hence at the end of the four second interval, when arm 302 passes out of engagement with segments 303, releasing the driving and holding pawls, a circuit is closed through stick relay 321 by way of conductor 345, this circuit being the same as that traced for relay 320 except that in place of conductor 335 it includes conductor 345. The stick circuit of relay 321 is also the same as that traced for relay 320 except that in place of conductor 341 it has the conductor 346. When now arm 311 approaches its initial position, it closes at contact 316 the circuit of magnet 324 through front contact 347 of relay 321.

If the vehicle is travelling under danger conditions, segment 304 will be operated through an angle of three teeth during the four-second interval in which the contact segments 303 are bridged. When operated through this angle arm 311 will engage contact 314, and when the segment is released a pick-up circuit is closed through relay 322 by way of conductor 350. This relay has a stick circuit including conductor 351, said circuit being otherwise the same as described for relay 320. When the arm returns to initial position the circuit of magnet 325 is closed at contacts 316 and then the stick circuit of relay 322 is broken at contacts 317.

From the above it will be understood that under clear conditions, magnet 323 is intermittently energized, once every four seconds, and when so energized maintains closed the circuit of clear lamp 326; that under caution conditions magnet 324 is intermittently energized, maintaining closed the circuit of caution lamp 327; and that under danger conditions magnet 325 is intermittently energized closing circuit of the danger lamp 328.

The invention is susceptible of embodiment in other forms than those described, and I do not intend to limit the scope thereof except as defined by the claims.

I claim:

1. A railway signalling system including a stretch of track the rails of which are conductively continuous throughout, means for impressing impulses of alternating energy across the track rails at a plurality of spaced points, said means operating to impress impulses at said points asynchronously, a vehicle having a translating device responsive to the impulses, and governing means controlled by the translating device adapted to give different indications according to the number of impulses transmitted in a fixed time.

2. A railway signalling system including a stretch of track the rails of which are conductively continuous throughout, means for impressing impulses of alternating energy across the track rails at a plurality of spaced points asynchronously, a vehicle having a translating device responsive to said impulses, step-by-step mechanism controlled by the translating device, and control mechanism variably affected according to the extent of movement of said mechanism within a given fixed time.

3. A railway signalling system including a stretch of track the rails of which are conductively continuous throughout, means for impressing impulses of alternating energy across the rails at a plurality of spaced points asynchronously, a vehicle travelling on the track having a translating device responsive to the impulses, impulse mechanism controlled by the translating device, train control devices governed by the impulse mechanism, a timing device and means operated thereby for rendering the impulse mechanism operative during regularly recurring periods of time.

4. A railway signalling system including in combination means for impressing impulses of alternating energy across the track rails at a plurality of spaced points asynchronously, a vehicle having a translating device responsive to the impulses whereby the translating device will be variably affected according to the number of points in advance of the vehicle from which energy is transmitted asynchronously and governing means controlled by the translating device adapted to give different indications according to the number of separate impulses transmitted in a given time.

5. A railway signalling system including in combination means for impressing impulses of electrical energy across the track rails at a plurality of spaced points asynchronously, a vehicle having a translating device responsive to said impulses whereby the translating device will be variably affected according to the number of points in advance of the vehicle from which energy is transmitted asynchronously, step-by-step mechanism controlled by the translating device, and control mechanism variably affected according to the extent of movement of said mechanism within a given fixed time.

6. A railway signalling system including in combination means for connecting electrical energy across the track rails at a plurality of spaced points asynchronously with substantial intervals between the connections and train control devices including impulse mechanism responsive to said energy adapted to give different indications according to the number of points in advance from which energy is transmitted thereto asynchronously.

7. A railway signalling system including a stretch of track, means for connecting sources of electrical energy across the track rails at a plurality of spaced points asynchronously with substantial time intervals between the successive connections, whereby impulses are received by a vehicle at any point on the track according to the number of points in advance from which energy is transmitted, a vehicle having a translating device responsive to the impulses and train control mechanism governed by said translating device.

8. In a railway signalling system, means for connecting electrical energy across the track rails at a plurality of spaced points asynchronously, said means including constantly operating motors and circuit controllers operated thereby, each circuit controller operating at all times independently of the other circuit controllers, and a vehicle having train control mechanism including a translating device responsive to said energy adapted to give different indications according to the number of points in advance from which energy is transmitted thereto asynchronously.

9. A railway signalling system including a stretch of track, means for connecting electrical energy across the track rails at a plurality of spaced points asynchronously, said means including constantly operating motors at said points and circuit controllers operated thereby, said circuit controllers being non-adjustable with respect to each other, and a vehicle having train control mechanism including a translating device responsive to said energy adapted to give different indications according to the number of points in advance of the vehicle from which energy is transmitted thereto asynchronously.

10. A railway traffic controlling system including in combination, means at spaced points along the track for causing asynchronous electrical impulses in the track rails, a vehicle having means for integrating the impulses per fixed interval of time, and train control devices governed by said integrating means adapted to give different indications according to the number of impulses received during said interval.

11. A railway traffic controlling system including in combination, switches at spaced points along the track adapted to close electrical connections across the track rails and thereby cause electrical impulses in said rails, means for closing said switches asynchronously and periodically, a vehicle having means for integrating the impulses per fixed interval, and signals governed by said integrating means selectively in accordance with the number of impulses received during said interval.

12. A railway traffic controlling system including in combination, a conductively continuous stretch of track, switches at spaced points along the track for closing electrical connections across the track rails and thereby causing electrical impulses to flow in the track rails, means for closing said switches asynchronously and periodically, a vehicle having means for integrating the impulses per fixed interval, and train control devices governed by said integrating means.

13. In a railway traffic controlling system, car carried apparatus adapted to cooperate with a track system having means to cause impulses of a certain frequency to flow in the track rails, comprising a coil disposed in inductive relation to the rails, a translating device connected to said coil, impulse counting means controlled by said device, means operating independently of the impulses for rendering said counting means operatively effective at recurring intervals, and train control mechanism governed by said counting means selectively according to the number of impulses received while said counting means is rendered operatively effective.

14. In a railway traffic controlling system, car carried apparatus adapted to cooperate with a track system having means to cause discrete electrical impulses to flow in the rails, comprising a coil disposed in inductive relation to the rails, a translating device connected to said coil, impulse counting means controlled by said translating device, a timing motor operating independently of the impulses adapted to render said impulse counting means operatively effective periodically during a definite interval of time, and train control mechanism governed by said impulse counting means selectively according to the number of impulses received during said interval.

In testimony whereof I hereunto affix my signature.

EDWARD C. SASNETT.